(12) United States Patent
Radhakrishnan et al.

(10) Patent No.: US 11,132,279 B2
(45) Date of Patent: *Sep. 28, 2021

(54) ROBOTIC PROCESS AUTOMATION ENABLED FILE DISSECTION FOR ERROR DIAGNOSIS AND CORRECTION

(71) Applicant: BANK OF AMERICA CORPORATION, Charlotte, NC (US)

(72) Inventors: Chandrashekhar Radhakrishnan, Hyderabad (IN); Vignesh Chandrasekaran, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/670,600

(22) Filed: Oct. 31, 2019

(65) Prior Publication Data
US 2020/0065223 A1  Feb. 27, 2020

Related U.S. Application Data

(63) Continuation of application No. 15/798,095, filed on Oct. 30, 2017, now Pat. No. 10,503,627.

(51) Int. Cl.
*G06F 11/36* (2006.01)

(52) U.S. Cl.
CPC ...... *G06F 11/3608* (2013.01); *G06F 11/3664* (2013.01)

(58) Field of Classification Search
CPC ............ G06F 11/3664; G06F 11/3608; G06F 11/3438; G06F 11/0787; G06F 11/0766
See application file for complete search history.

(56) References Cited

U.S. PATENT DOCUMENTS

| | | |
|---|---|---|
| 5,907,709 A | 5/1999 | Cantey et al. |
| 6,738,908 B1 | 5/2004 | Bonn et al. |
| 7,174,563 B1 | 2/2007 | Brownlie et al. |
| 7,260,844 B1 | 8/2007 | Tidwell et al. |
| 7,383,578 B2 | 6/2008 | Blake et al. |
| 7,606,915 B1 | 10/2009 | Calinov et al. |

(Continued)

OTHER PUBLICATIONS

Kyoungho An, Resource Management and Fault Tolerance Principles for Supporting Distributed Real-time and Embedded Systems in the Cloud, Dec. 3, 2012, ACM, pp. 1-6. (Year: 2012).

(Continued)

*Primary Examiner* — Nadeem Iqbal
(74) *Attorney, Agent, or Firm* — Michael A. Springs; Moore & Van Allen PLLC; R. W. McCord Rayburn

(57) ABSTRACT

A system for robotic process automation enabled file dissection for error diagnosis and correction is provided. The system comprises a memory device; a communication device in communication with a network; and a processing device operatively coupled to the memory device and the communication device, wherein the processing device is configured to: detect an operation executed by the user in an application on a user device; based on detecting the operation executed by the user, reproduce, using a robotic process automation module, the operation in parallel with execution of the operation by the user to generate a simulated operation; and store the simulated first operation in a user operation record.

20 Claims, 3 Drawing Sheets

(56) References Cited

U.S. PATENT DOCUMENTS

| | | | |
|---|---|---|---|
| 7,680,809 B2* | 3/2010 | Deng | G06F 11/3079 707/706 |
| 7,752,554 B2 | 7/2010 | Biggs et al. | |
| 7,861,252 B2* | 12/2010 | Uszok | H04L 67/10 719/317 |
| 7,937,624 B2 | 5/2011 | Qing et al. | |
| 7,966,654 B2 | 6/2011 | Crawford | |
| 7,966,655 B2 | 6/2011 | Acharya et al. | |
| 7,966,659 B1 | 6/2011 | Wilkinson et al. | |
| 8,065,719 B2 | 11/2011 | Yang | |
| 8,171,406 B1 | 5/2012 | Newstadt et al. | |
| 8,239,674 B2 | 8/2012 | Lee et al. | |
| 8,285,652 B2 | 10/2012 | Biggs et al. | |
| 8,397,282 B2 | 3/2013 | Turley et al. | |
| 8,418,240 B2 | 4/2013 | Wool | |
| 8,448,139 B2* | 5/2013 | Ghosh | G06F 11/3636 717/124 |
| 8,549,643 B1 | 10/2013 | Shou | |
| 8,572,733 B1 | 10/2013 | Rockwood | |
| 8,588,767 B2* | 11/2013 | Fujimoto | H04M 1/24 455/425 |
| 8,793,578 B2 | 7/2014 | Mounty et al. | |
| 8,819,825 B2 | 8/2014 | Keromytis et al. | |
| 8,935,673 B1 | 1/2015 | Ashkenazi et al. | |
| 8,955,743 B1 | 2/2015 | Block et al. | |
| 9,021,419 B2 | 4/2015 | Pana et al. | |
| 9,105,143 B1 | 8/2015 | Huggins et al. | |
| 9,215,213 B2 | 12/2015 | Bansal et al. | |
| 9,280,406 B2 | 3/2016 | Ghosh | |
| 9,311,632 B1 | 4/2016 | Dent | |
| 9,354,909 B2 | 5/2016 | Black | |
| 9,356,942 B1 | 5/2016 | Joffe | |
| 9,356,957 B2 | 5/2016 | Keromytis et al. | |
| 9,450,901 B1 | 9/2016 | Smullen et al. | |
| 9,462,013 B1 | 10/2016 | Boss et al. | |
| 9,555,544 B2 | 1/2017 | Bataller et al. | |
| 9,600,456 B2 | 3/2017 | Sriganesh et al. | |
| 9,641,544 B1 | 5/2017 | Treat et al. | |
| 9,647,968 B2 | 5/2017 | Smullen et al. | |
| 9,667,596 B2 | 5/2017 | Halabi | |
| 9,674,222 B1 | 6/2017 | Joffe | |
| 9,817,967 B1 | 11/2017 | Shukla et al. | |
| 9,923,908 B2 | 3/2018 | Boss et al. | |
| 10,110,629 B1 | 10/2018 | Kruse et al. | |
| 10,187,337 B2 | 1/2019 | Smullen et al. | |
| 10,404,747 B1 | 9/2019 | Sela et al. | |
| 10,482,232 B2 | 11/2019 | Buddhiraju et al. | |
| 10,574,698 B1 | 2/2020 | Sharifi Mehr | |
| 10,733,037 B2 | 8/2020 | Ramakrishna et al. | |
| 2002/0184528 A1 | 12/2002 | Shevenell et al. | |
| 2003/0046583 A1 | 3/2003 | Goldman et al. | |
| 2004/0030747 A1* | 2/2004 | Oppermann | G06F 11/3414 709/203 |
| 2004/0168173 A1 | 8/2004 | Cohen et al. | |
| 2005/0044418 A1 | 2/2005 | Miliefsky | |
| 2005/0076237 A1 | 4/2005 | Cohen et al. | |
| 2005/0166072 A1 | 7/2005 | Converse et al. | |
| 2006/0090136 A1 | 4/2006 | Miller et al. | |
| 2006/0191010 A1 | 8/2006 | Benjamin | |
| 2007/0143847 A1 | 6/2007 | Kraemer et al. | |
| 2008/0168425 A1 | 7/2008 | Sen et al. | |
| 2009/0038014 A1 | 2/2009 | Force et al. | |
| 2010/0223327 A1 | 9/2010 | Srivastava et al. | |
| 2011/0131644 A1 | 6/2011 | Keanini et al. | |
| 2012/0144493 A1 | 6/2012 | Cole et al. | |
| 2013/0227697 A1 | 8/2013 | Zandani | |
| 2014/0359708 A1 | 12/2014 | Schwartz | |
| 2015/0213369 A1 | 7/2015 | Brandt et al. | |
| 2016/0006755 A1 | 1/2016 | Donnelly et al. | |
| 2016/0048502 A1 | 2/2016 | Montenegro et al. | |
| 2016/0134653 A1 | 5/2016 | Vallone et al. | |
| 2016/0134953 A1 | 5/2016 | Kramer | |
| 2016/0205122 A1 | 7/2016 | Bassett | |
| 2016/0335016 A1 | 11/2016 | Kurian et al. | |
| 2017/0173784 A1 | 6/2017 | Shah et al. | |
| 2017/0177416 A1 | 6/2017 | Altman et al. | |
| 2017/0235940 A1 | 8/2017 | McEwen et al. | |
| 2017/0269972 A1 | 9/2017 | Hosabettu et al. | |
| 2017/0270431 A1 | 9/2017 | Hosabettu et al. | |
| 2017/0352041 A1 | 12/2017 | Ramamurthy et al. | |
| 2017/0359382 A1 | 12/2017 | Rogers et al. | |
| 2017/0364355 A1 | 12/2017 | Nitschke et al. | |
| 2018/0007004 A1 | 1/2018 | Basler | |
| 2018/0075233 A1 | 3/2018 | Gray | |
| 2018/0160309 A1 | 6/2018 | Turgeman et al. | |
| 2018/0197123 A1 | 7/2018 | Parimelazhagan et al. | |
| 2018/0285839 A1 | 10/2018 | Yang et al. | |
| 2018/0322410 A1 | 11/2018 | McLean et al. | |
| 2018/0329399 A1 | 11/2018 | Neelakandan et al. | |
| 2018/0370029 A1 | 12/2018 | Hall et al. | |
| 2019/0004932 A1 | 1/2019 | Misra et al. | |
| 2019/0007453 A1 | 1/2019 | Nimmagadda et al. | |
| 2019/0089740 A1 | 3/2019 | Hastings | |
| 2019/0102676 A1 | 4/2019 | Nazari et al. | |
| 2019/0129824 A1 | 5/2019 | Radhakrishnan et al. | |
| 2019/0129827 A1 | 5/2019 | Ramasamy et al. | |
| 2019/0130094 A1 | 5/2019 | Votaw et al. | |
| 2019/0155225 A1 | 5/2019 | Kothandaraman et al. | |
| 2019/0182289 A1 | 6/2019 | White | |
| 2019/0188114 A1 | 6/2019 | Hopper et al. | |
| 2019/0332508 A1 | 10/2019 | Goyal et al. | |
| 2019/0347185 A1* | 11/2019 | Moore | G06F 9/466 |
| 2020/0067923 A1 | 2/2020 | Dasari et al. | |
| 2020/0401430 A1 | 12/2020 | Berg et al. | |
| 2021/0122051 A1 | 4/2021 | An et al. | |
| 2021/0129325 A1 | 5/2021 | Yu et al. | |

OTHER PUBLICATIONS

Shankar Mahadevan et al., A Network Traffic Generator Model for Fast Network-on-Chip Simulation, Mar. 7-11, 2005, ACM, vol. 2, pp. 780-785. (Year: 2005).

Lee Breslau et al., Advances in Network Simulation, IEEE, vol. 33, Issue: 5, May 2000, pp. 59-67. (Year: 2000).

J. Burns et al., Automatic Management of Network Security Policy, Aug. 7, 2002, IEEE, pp. 12-26. (Year: 2002).

D. Portugal, S. Pereira and M. S. Couceiro, "The role of security in human-robot shared environments: A case study in ROS-based surveillance robots," 2017 26th IEEE International Symposium on Robot and Human Interactive Communication (RO-MAN), Lisbon, 2017, pp. 981-986. (Year: 2017).

Wickramasuriya, Jehan, et al. "Privacy protecting data collection in media spaces." Proceedings of the 12th annual ACM international conference on Multimedia. 2004, pp. 48-55. (Year: 2004).

Seungwon Shin, Zhaoyan Xu and Guofei Gu, "EFFORT: Efficient and effective bot malware detection," 2012 Proceedings IEEE INFOCOM, Orlando, FL, 2012, pp. 2846-2850. (Year: 2012).

Sylvain P. Leblanc et al., An Overview of Cyber Attack and Computer Network Operations Simulation, Apr. 2011, ACM, pp. 92-100. (Year: 2011).

Chen Ming et al., Three Propositions about Distributions of Network Traffic, Mar. 2007, ACM, vol. 1, pp. 187-192. (Year: 2007).

Michael E. Kuhl et al., Cyber Attack Modeling and Simulation for Network Security Analysis, Jan. 4, 2008, IEEE, pp. 1180-1188. (Year: 2008).

* cited by examiner

ROBOTIC PROCESS AUTOMATION ENABLED FILE DISSECTION FOR ERROR DIAGNOSIS AND CORRECTION

CROSS-REFERENCE TO RELATED APPLICATIONS

This application is a continuation application of U.S. patent application Ser. No. 15/798,095, filed Oct. 30, 2017, the contents of which are hereby incorporated by reference herein.

BACKGROUND

With an increasing dependence on technology, computer systems are relied upon to complete various tasks and increase user and/or process efficiency. However, difficulties such as program crashes, file corruption, and operating errors can present themselves and interrupt typical operation of a system or device. Further these errors can be extremely technical in nature requiring expert knowledge or specialized tools outside the realm of a typical user in order to repair. Due to the complex nature of computer system and device errors and the level of technical detail required for proper correction, a tool for efficient diagnosis and rectification of said errors is required.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system for robotic process automation enabled file dissection for error diagnosis and correction is provided. The system comprises a memory device; a communication device in communication with a network; and a processing device operatively coupled to the memory device and the communication device, wherein the processing device is configured to: detect an operation executed by the user in an application on a user device; based on detecting the operation executed by the user, reproduce, using a robotic process automation module, the operation in parallel with execution of the operation by the user to generate a simulated operation; and store the simulated first operation in a user operation record.

In a particular embodiment, the processing device is further configured to install the robotic process automation module on the user device. In another embodiment, the processing device is a first processing device, and the robotic process automation module is configured to command a second processing device associated with the user device to execute the simulated operation in parallel with execution of the operation by the user.

In yet another embodiment, the simulated operation is executed in a virtual environment. In yet another embodiment, the robotic process automation module is configured to monitor and reproduce the operation executed by the user in real-time.

In yet another embodiment, the robotic process automation module is configured to reproduce the operation executed by the user by interacting directly with a presentation layer of a user interface of the user device.

In yet another embodiment, the user device is commanded to terminate the operation executed by the user and switch to the simulated operation based on determining an error associated with the operation executed by the user that is not present in the simulated operation, wherein a result of the simulated operation replaces a result of the operation executed by the user.

In yet another embodiment, the operation executed by the user comprises executing a command, altering a file, or entering data. In yet another embodiment, an error log is stored within the file or the application associated with the error.

In yet another embodiment, the processing device is further configured to: receive an indication of an error associated with the application; based on receiving the indication of the error, extract the user operation record and device information from the user device; generate a support ticket comprising the user operation record and the device information; and transmit the support ticket to a support representative workstation. In yet another embodiment, the processing device is further configured to: compare a result of the operation executed by the user with an expected result; and based on the result of the operation executed by the user not matching the expected result, generate the indication of the error.

In yet another embodiment, the processing device being further configured to automatically generate the support ticket and transmit the support ticket to the support representative workstation, wherein the support ticket includes the user operation record. In yet another embodiment, the indication of the error is a message transmitted from the user. In yet another embodiment, the processing device is configured to monitor messages from the user for one or more keywords related to the error, and based on the one or more keywords related to the error, automatically generate the support ticket.

In yet another embodiment, the robotic process automation module comprises a process recorder.

A computer program product for robotic process automation enabled file dissection for error diagnosis and correction is also provide. The computer program product comprises at least one non-transitory computer-readable medium having computer-readable program code portions embodied therein, the computer-readable program code portions comprising: an executable portion configured for detecting an operation executed by the user in an application on a user device; an executable portion configured for reproducing, using a robotic process automation module, the operation in parallel with execution of the operation by the user to generate a simulated operation based on detecting the operation executed by the user; and an executable portion configured for storing the simulated first operation in a user operation record.

In a particular embodiment, the computer-readable program code portions further comprising an executable portion configured for installing the robotic process automation module on the user device. In another embodiment, the simulated operation is executed in a virtual environment. In yet another embodiment, the robotic process automation module is configured to reproduce the operation executed by the user by interacting directly with a presentation layer of a user interface of the user device.

A computer-implemented method for robotic process automation enabled file dissection for error diagnosis and correction is also provided. The method comprises: detecting an operation executed by the user in an application on a user device; based on detecting the operation executed by the user, reproducing, using a robotic process automation module, the operation in parallel with execution of the operation by the user to generate a simulated operation; and storing the simulated first operation in a user operation record.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
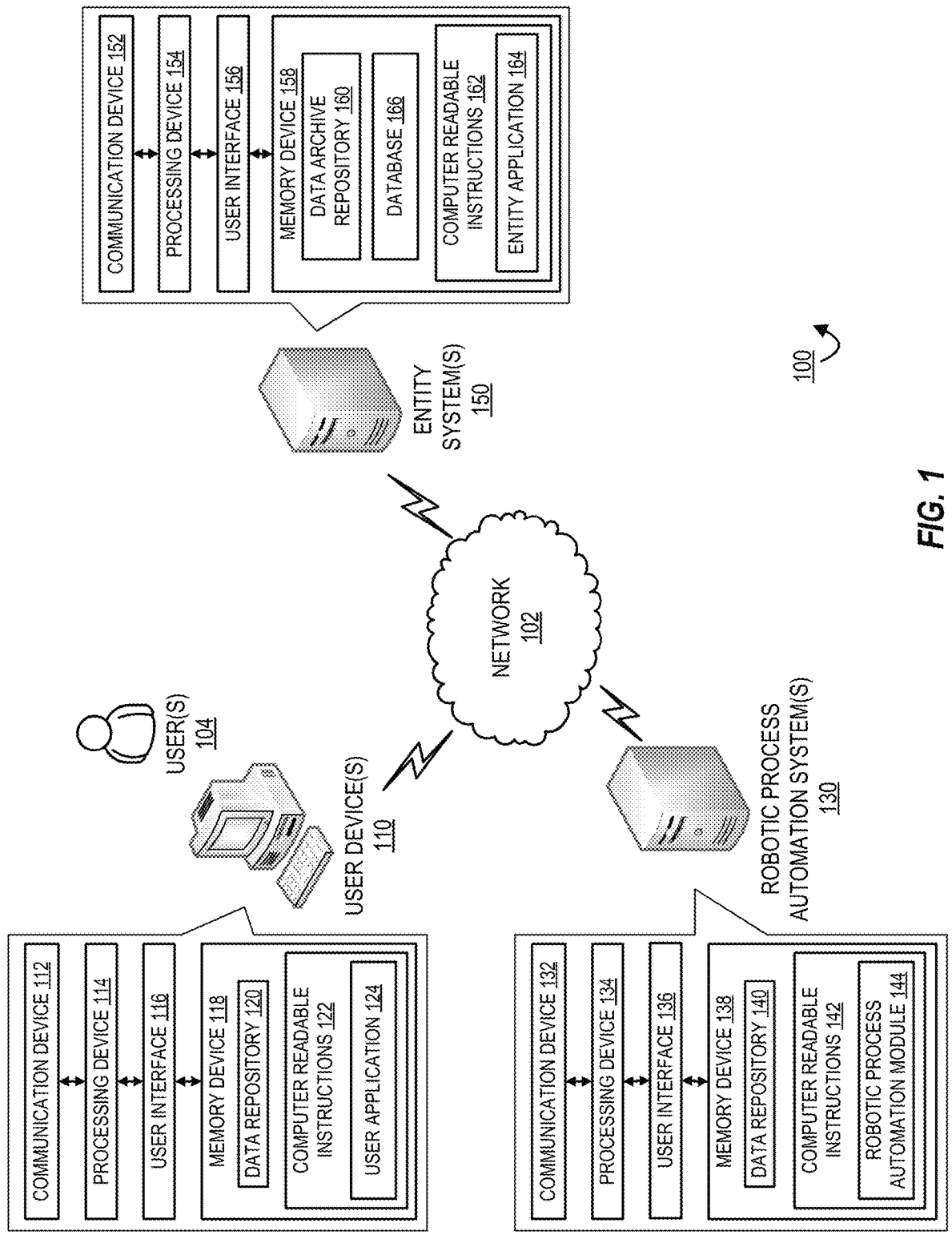
Figure 2:
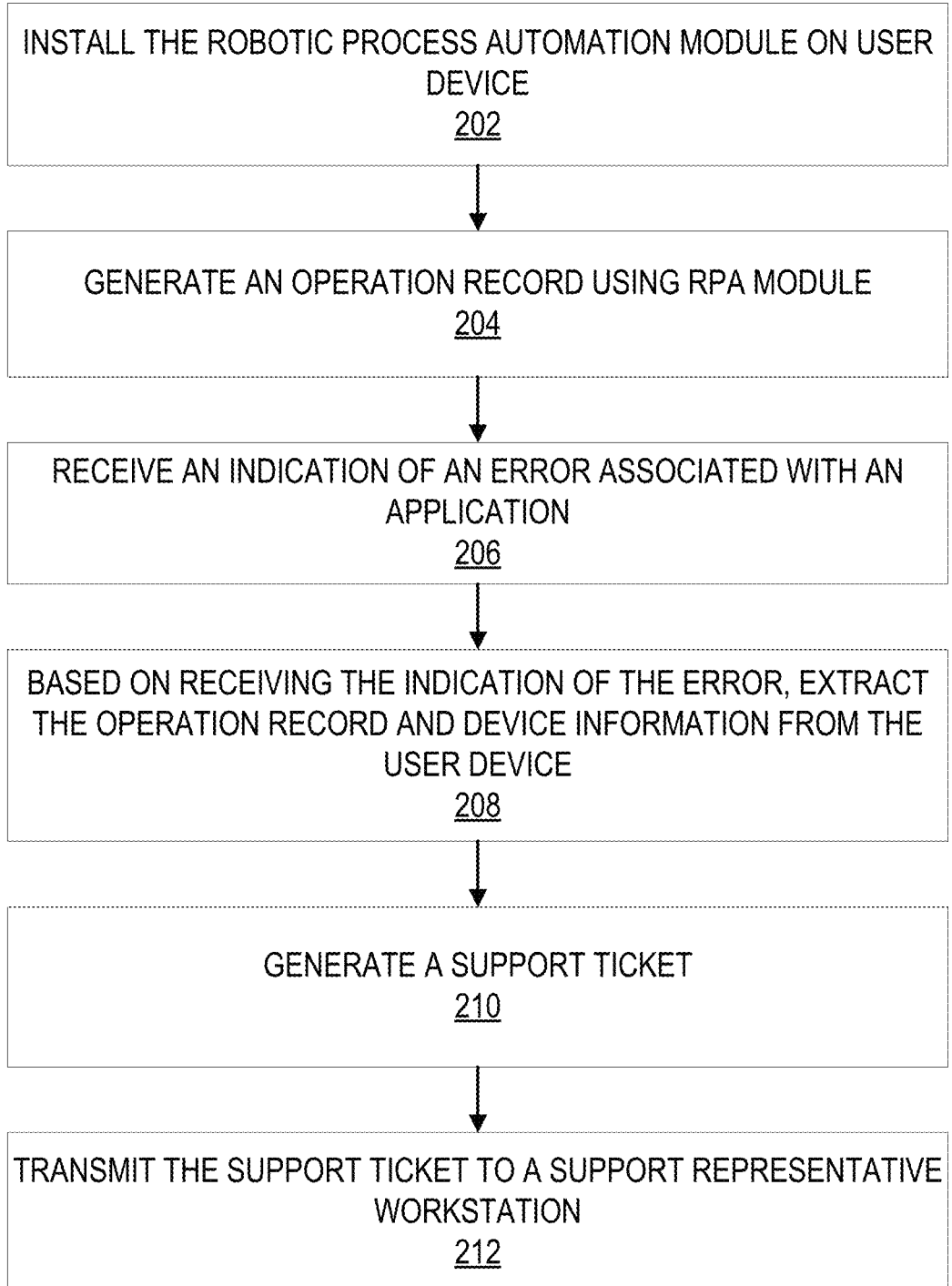
Figure 3:
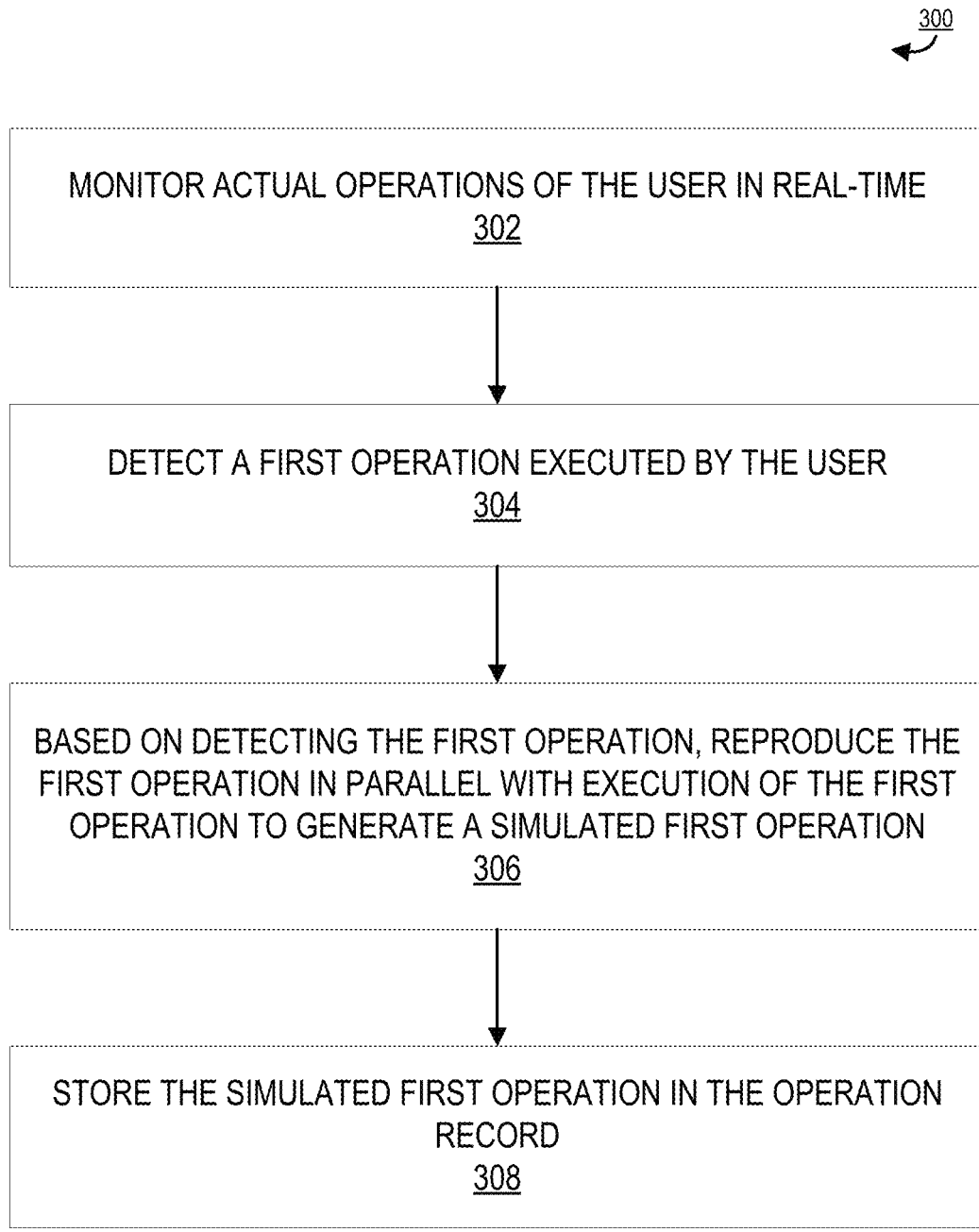

Having thus described embodiments of the invention in general terms, reference will now be made the accompanying drawings, wherein:

FIG. 1 provides an automated error diagnosis and correction system and environment, in accordance with an embodiment of the invention;

FIG. 2 provides a high-level process flow for automated error diagnosis and correction, in accordance with embodiments of the invention; and FIG. 3 provides a high-level process for robotic process automation module simulation of user operation, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

A "user" as used herein may refer to any entity or individual associated with the automated error diagnosis and correction system. In some embodiments, a user may be a computing device user, a mobile device application user, a financial institution customer (e.g., an account holder or a person who has an account (e.g., banking account, credit account, or the like)), a system operator, database manager, a helpdesk support technician, and/or employee of an entity. For example, a user may be a user of a computer system or device that experiences an error, while another user may be a helpdesk technician or support representative assigned to advise on the correction of said error. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In some embodiments, a user device may refer to an entity's computer system, servers, databases, networked devices, or the like. The user device may be used by the user to access the system directly or through an application, online portal, internet browser, virtual private network, or the like. The user device may be a computer device within a network of connected computer devices that share one or more network storage locations. In some embodiments, the user device may refer to a support representative's computer workstation.

As used herein, the term "resource" may be used to refer to elements of one or more computing devices, networks, or the like available to be used in the execution of tasks or processes. A resource may include processor, memory, or network bandwidth and/or power used for the execution of tasks or processes. A resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

In accordance with embodiments of the invention, the term "entity" may be used to include any organization or collection of users that may interact with the automated error diagnosis and correction system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

"Authentication information" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more devices, a transmission of a requested task, a reporting and correction of an error, or the like. In another example, an interaction may refer to a user interaction with a user device through a user interface.

As used herein, a "robotic process automation module", "RPA module", "robot", or "bot" may refer to a, device, tool, system, application, or the like for performing automated processes on a user device, computer system, server, or the like. Robotic process automation may refer to the automation of high-volume processes using said modules. The RPA module is typically specialized computer software or hardware installed on a device that mimics user interaction with a user interface (UI). For example, an RPA module may provide inputs to the UI of other applications. The RPA module may typically interacts with a presentation layer of the computer system (i.e., the UI) and avoids more demanding interaction with any underlying data layers or logic of the underlying system in order to instruct operation of the user device, computer system, application, or the like. In some embodiments, the module may be configured to repeat one or more tasks assigned to the module. Further an RPA module is scalable, wherein a plurality of bots may be used to perform various functions for high-volume applications related to executable tasks of said entity.

RPA modules or "bots" are used throughout various industries to automatically execute one or more processes typically on the back-end of a computing system or device. These bots can be embodied as customized software that can be installed on a computer system and that interacts directly with other devices, systems, applications, or the like in a way that mimics user activity on said devices, systems, or application. These highly customizable bots can be configured to perform tasks such as web-scraping, screen-scraping, gathering and comparing data, and document and data storage (e.g., in a central repository for future access). However said bots also have the capability, based on their configuration, to perform more complex tasks such as those tasks described herein. Bots uniquely instruct other devices, systems, and applications how to operate and accomplish assigned tasks. Traditionally, similar instruction and integration with existing systems required the use of particular machine-to-machine forms of communication based on data layers such as Application Programming Interfaces (APIs) which operate at an architectural layer or data layer beneath a user interface. This form of integration is normally costly, time-consuming, and generally requires substantial investment on behalf of an entity especially if the results are desired on a large-scale. Furthermore, transformation of existing systems to accommodate newly required capabilities can be complex and problematic for a large-scale entity.

The implementation of bots within an existing system provides a departure from these traditional forms of integration. Bots are trained to mimic user activity directly with a UI by only addressing a presentation layer of the computer system or device, not the underlying data layer of the system. The bot may transmit signals and commands electronically which mimic input signals sent directly through the UI. For example, a bot may transmit signals which simulate mouse and keyboard inputs to execute commands and perform automated tasks. These bot commands may not occur on a display device itself, but rather be performed in a virtual environment wherein the bot interprets the display of a screen electronically. Further, advantageously, these bots can be "trained" or essentially programed to execute tasks simply by even a non-tech-savvy user through the use of simple drag and drop task functionality or configuration wizards without any required coding experience or code-based instructions. Bots typically comprise some form of developer tools for defining jobs or tasks that may comprise step-by-step instructions, rules, condition logic, if/then decision making, or the like. A robot controller of the bot may act as a primary repository for providing tasks, credentials, permissions, or the like to bots and users only when required in order to assign jobs while monitoring and reporting job execution and status. Meanwhile, the bots themselves interact directly with the systems, applications, or the like to complete said jobs. Bots may further comprise a process recorder for capturing and recording a sequence of user actions for further training or completing tasks. This feature may prove valuable for error analysis and correction as well as for regulatory compliance with audits. Bots especially allow large entities to avoid the laborious process of traditional system redesign typically associated with existing system integration of new tasks, systems, or the like. Bots allow for a simple, timely, and low-cost alternative to traditional methods and are further attractive due to their scalability, consistency, and reusability.

The present invention leverages robotic process automation (RPA) technology to overcome the technical difficulties and problems discussed above to diagnose and rectify errors experienced during typical operation of a system or user device. By leveraging robotic process automation technology, the present invention reduces the amount of computing resources required to execute tasks when compared with executing the same tasks using a traditional application programming interface (API). Furthermore, due to the simple nature of designing and tailoring the functions of bots, a user or entity would be able to avoid the costly and time-consuming process of building a new and complicated API-based systems from the ground up. Additionally, the bots are able to transform output signals to simulate input signals related to input devices of a user interface (e.g., keyboards, mouse, touch-screen, microphone, or the like) allowing for the simulation of user input directly at the presentation layer of the application. Other applications or programs would not typically interact with another application in this manner, instead interaction through the data layer would require more complex programming requiring additional resources for development and operation. The bot application however interacts with the application at the user interface level and has the ability to input information or data into another application, whereas a typical application would be waiting for an input.

FIG. 1 provides a block diagram illustrating an automated error diagnosis and correction system and environment 100, in accordance with an embodiment of the invention. The environment 100 includes a user device 110 associated and/or used with authorization of a user 104, a robotic process automation (RPA) system 130, and an entity system 150. It should be understood, that within the environment 100 there may be more than one of any of the components or systems described or that one or more of components or systems may be embodied as a single device.

As used herein, a "processing device," such as the processing devices 114, 134, and 154 generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" such as the user interfaces 116, 136, and 156, generally includes a plurality of interface devices and/or software that allow a user to input commands and/or data to direct the processing device to execute instructions or tasks. For example, the user interfaces presented in FIG. 1 may include a graphical user interface (GUI) or an interface to input computer-executable instructions that direct the processing device to carry out specific functions. The user interface employs certain input and output devices to input data received from a user or output data to a user. When a user interacts with the input and output devices, the device or system generates a signal specific to that input device to process the user interaction. These input and output devices may include a display, mouse, keyboard, button, touchpad, touch screen, microphone, speaker, LED, light, joystick, switch, buzzer, bell, and/or other user input/output device for communicating with one or more customers. Typically a user interacts with a user interface of a device which is managed and bridged to data accessed by a data layer via a presentation layer. The presentation layer communicates with the data layer to translate messages, commands, and the like between the user and the data layer of an application.

As used herein, a "memory device" such as memory devices 118, 138, and 158, generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication device" generally includes a modem, server, transceiver, and/or other device for communicating with other devices on a network, and/or a user interface for communicating with one or more customers. Referring again to FIG. 1, the communication devices 112, 132, and 152 comprise communication interfaces having one or more devices configured to communicate with one or more other devices on a network, such as a mobile device, a personal computing device, a server, a distributed computing cluster, third party systems, and/or the like. The processing device is configured to use the network communication device to transmit and/or receive data and/or commands to and/or from the other devices connected to the network. Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

The systems and devices communicate with one another over the network 102 and perform one or more of the various steps and/or methods according to embodiments of the disclosure discussed herein. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet.

The user device 110 includes a communication device 112 communicably coupled with a processing device 114, which is also communicably coupled with a memory device 118. In some embodiments, the communication device 112 may also comprise a GPS transceiver capable of determining a geographic location associated with the user device 110. The processing device 114 is configured to control the communication device 112 such that the user device 110 communicates across the network 102 with one or more other systems. The processing device 114 is also configured to access the memory device 118 in order to read the computer readable instructions 122, which in some embodiments includes a user application 124. The user application 124 allows for communication of the user device 110 with the other systems and devices within the environment 100 such as the RPA system 130 and/or entity system 150. The user application 124 allows the user 104 to receive information transmitted as well as input information requested by the other systems and communicate with and request the execution of tasks from the RPA system, application, or module; one or more third parties; and/or other entities. In some embodiments, the user application 124 further allows the user to interact with and/or manipulate the user application 124 via the user device 110 and the user interface 116. The memory device 118 also includes a data repository 120 or database for storing pieces of data or files that can be accessed by the processing device 114.

The robotic process automation (RPA) system 130 includes a communication device 132 communicably coupled with a processing device 134, which is also communicably coupled with a memory device 138. The processing device 134 is configured to control the communication device 122 such that the RPA system 130 communicates across the network 102 with one or more other systems. The processing device 134 is also configured to access the memory device 138 in order to read the computer readable instructions 142, which in some embodiments includes a RPA module 144 or application. The RPA module 144 allows for communication with the other systems and devices within the environment 100 such as the user device 110 and/or the entity system 150 and for the customization and installation of a RPA module or "bot" on another device in the system such as the user device 110. The memory device 138 also includes a data repository 140 or database for storing pieces of data or files that can be accessed by the processing device 134. In some embodiments, the data repository 140 may be used to store an operation record of user actions or an error log. In some embodiments, the data repository 140 further comprises a suite of additional applications or built in functions for use by the RPA system 130. In some embodiments, the RPA system 130 may be part of the user device 110 and/or entity system 150.

The entity system 150 includes a processing device 154 operatively coupled to a network communication device 152 and a memory device 158. The processing device 154 is configured to control the communication device 152 such that the entity system 150 communicates across the network 102 with one or more other systems. The processing device 154 is also configured to access the memory device 158 in order to read the computer readable instructions 162, which in some embodiments includes an entity application 164. The entity application 164 allows for communication with the other systems and devices within the environment 100 such as the user device 110 and/or the RPA system 130. The memory device 158 also includes a data repository 160 or database for storing pieces of data or files that can be accessed by the processing device 154. In some embodiments, the data repository 160 may store user information or device information for a user or device that is associated with the entity (e.g., a customer and the customer's device).

The user application 124, the RPA module 144, and the entity application 164 are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the RPA module 144 is stored and configured for being accessed by a processing device of the user device 110 connected to the network 102. In various embodiments, the user application 124, the RPA module 144, and the entity application 164 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one or more of the systems discussed above, such as the entity system 150, may be embodied as more than one system and the various components of the system are not collocated, and in various embodiments, there are multiple components performing the functions indicated herein as a single device. For example, in one embodiment, multiple processing devices may perform the functions of the processing device 134 of the RPA system 130 described herein. Furthermore, one or more of the various device and/or systems described herein may be embodied as one or more combined devices and/or systems.

In various embodiments, the user device 110, the RPA system 130, the entity system 150, and/or other systems may perform all or part of a one or more method or process steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

FIG. 2 provides a high-level process flow for automated error diagnosis and correction, in accordance with embodiments of the invention. Referring now to block 202 of FIG. 2, the system first installs a robotic process automation (RPA) module on the user device. The RPA module may be configured, programmed, or "taught" to execute one or more operations such as reproduce user input into the user device as described herein. Configuration of the RPA module may be performed by the entity system before installation, wherein after configuration, the module is installed on the user device, for example, over the network. In another embodiment, the RPA module may be installed on the user device and subsequently configured by the entity system and/or one or more of the other systems of the environment 100. In one example, the RPA module is configured in real-time on the user device while monitoring the user input operations of the user on the user device.

Installation and/or configuration of the RPA module on a device may be triggered through a manual installation of the module by the user. For instance, the user may select and download the module from a source such as an app store. In another embodiment, the user device may be commanded by one of the other systems described herein (e.g., the RPA system) to automatically install the RPA module on the user device with at most minimal input from the user such as accepting the installation when prompted. The installation command and/or the installation and configuration itself may occur remotely over the network. In yet another embodiment of the invention, the RPA module may be installed to the user device through another application (e.g., a customer support application, a mobile banking application, an entity's internal operations application, or the like). For example, a client may be accessing a mobile banking application associated with a banking entity on a mobile device. Upon detecting access to the mobile banking application via the mobile device, the banking entity's system may automatically instruct the user device to install the RPA module via the mobile banking application with or without requiring explicit permission from the user. In other embodiments, the RPA module may be installed and hosted on a system other than the user device (e.g., the RPA system or entity system), wherein the RPA module remotely interacts with the user device over the network.

In general, the RPA module detects one or more operations of the user within an application on the user device. In some embodiments, the one or more operations may include the manipulation a file or other data within the application. In other embodiments, the one or more operations detected and monitored by the RPA module may not be performed directly by the user, but performed automatically by the user device or an application of the user device. In some embodiments, the RPA module may command the processing device of the user device to execute one or more operations or processes described herein. In some embodiments, the RPA module may operate in the background of another application without interrupting the normal operating routine of the user within an application. For example, the one or more operations may comprise the user executing a series of commands within an application, deleting or otherwise altering files, entering data or information via a user interface, or the like.

Next at block 204 of FIG. 2, the system generates an operation record using the RPA module. As previously discussed, the RPA module monitors for one or more operations of the user device and/or an application executed on the user device. The one or more operations can be executed manually by the user via a user interface or automatically by the user device or application itself. The operation record generally comprises a recording of said one or more operations executed on the user device.

The operation record may further comprise user information, device information, or the like in addition to the record of operations. For example, the operation record may be used to store device information such as resource use and availability, device identification information (e.g. serial numbers, device specifications), or the like. Additionally, the operation record may further comprise user information such as usernames, passwords, authentication credentials, or other personal identifying information which may have been input and/or stored by the user within the application during operation. Further, the operation record may comprise any data or information entered by the user into a user interface of the application (e.g., selected options, altered settings, completed fields or the like). The operation record may be collected as a list of executed commands or input data detected by the RPA module such as in a text file, .csv file, or the like.

Turning now to FIG. 3, which provides a high-level process flow for robotic process automation module simulation of user operation, at block 302, the system monitors actual operations of the user in real-time. Actual operations of the user may comprise any operations or commands executed manually by the user via a user interface or automatically by the user device or application itself as a result of user interaction. This may include operations such as selecting options (e.g., a check box, drop-down menu), completing a field, altering application or file settings, or the like as previously discussed. In some embodiments, monitoring may be performed in real-time by the RPA module.

Next at block 304 of FIG. 3, the system detects a first operation executed by the user. In some embodiments, the RPA module monitors and detects the first operation. The RPA module may intercept an input signal received from the user via the user interface or an input device to detect the first operation. For example, the RPA module may detect one or more keystrokes of a user on a keyboard.

At block 306 of FIG. 3, based on detecting the first operation, the system may reproduce the first operation in parallel with execution of the first operation to generate a simulated first operation. In this way, the simulated operations generated by the RPA module may act as a mirror of the actual user operations and be used as an accurate, complete operation record which details the user operations in their entirety. In other embodiments, the RPA module monitors user operations and generates an operation log the user operations without reproducing a parallel string of user-executed operations, wherein a record of the user input is generated for future reference and reproduction.

In some embodiments, the RPA module interacts directly with a presentation layer of the application within a virtual environment. In this way, the RPA module can execute an operation while simulating a user interaction with the application. In some embodiments, the RPA module may transmit an input signal to the application that simulates a user interaction with a user interface. By simulating a user input and interacting directly with the presentation layer of the application, the RPA module can be easily implemented without the need to design a typically more complex solution for interacting with a data layer of the application.

Next at block 308 of FIG. 3, the system stores the simulated first operation in the operation record. In some embodiments, RPA module may store the simulated first operation with device information and/or user information in the operation record. The RPA module may continue to monitor, detect, reproduce, and store the actual user operations to further populate the operation record, wherein subsequent user operations are detected and stored similar to the first operation.

Referring now back to FIG. 2, at block 206, the system receives an indication of an error associated with the application. In some embodiments, an error may be any interruption of normal operation of the application of a file associated with the application. Errors may include application process failures, crashes, bugs, glitches, corrupted files, missing files, or the like. In some embodiments, the system compares the results of the actual operations of the user with an expected result of the operations to determine the presence of an error and transmit an indication to the system. Based on a result of the actual operations not matching the expected result, the system may generate the indication of the error. In other embodiments, the indication of the error may be a message transmitted the user (e.g., an email), wherein the RPA module may extract keywords related to known errors from the message to generate a support ticket.

In some embodiments, upon receiving an indication of an error, the system may be configured to command the user device to terminate a current string of operations involving the error. If it is determined that the simulated operations being executed in the virtual environment by the RPA module in parallel with the actual operations do not contain the same error as the actual operations (i.e., operating normally), then a result of the simulated operations may replace a result of the actual operations on the user device, wherein the user device may continue previous operations using the back-up simulated operations executed in parallel by the RPA module. Subsequently, a new string of simulated operations may be generated by the RPA module.

At block 208 of FIG. 2, based on receiving the indication of the error, the system extracts the operation record and device information from the user device. In some embodiments, system may generate an error log in addition to or as part of the operation record along with the device information. The extracted information may be stored by a maintaining entity in a central repository or database for future reference and further training and configuration of RPA modules for customized tasks. In some embodiments, the system, such as the RPA module, may store an error log within the application itself or within a file associated with the error for future reference, wherein the file itself is altered by the system as a result of the process described herein.

Finally at block 210 of FIG. 2, the system generates a support ticket and, at block 212, transmits the support ticket to a support representative workstation. The support ticket generated by the system may comprise the operation record, user device information, user information, details of the error, details of the application or file related to the error, or the like. In this way, a support representative may receive a complete summary of the reported error without needing to manually fill out the support ticket. The representative's time may be used more efficiently for more complex tasks.

In some embodiments, the RPA module or other component of the system may extract keywords from a message sent from the user associated with the error in order to automatically generate or complete at least a portion of the support ticket. For example, the system may extract a username, email address, one or more error-related keywords, device information, and/or the like from an email sent from a user reporting an error with a user device and auto-populate at least a portion of a support ticket (e.g., complete fields). For example, the RPA module may extract the word "freeze" from an email from a user reporting an application freeze and crash.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein.

Moreover, it should be understood that the process flows described herein include transforming the information sent and/or received from the applications of the different systems (e.g., internally or externally) and/or the devices from one or more data formats into a data format associated with the application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, are merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for robotic process automation enabled file dissection for error diagnosis and correction, the system comprising:
   a memory device;
   a communication device in communication with a network; and
   a processing device operatively coupled to the memory device and the communication device, wherein the processing device is configured to:
      detect an operation executed by a user in an application on a user device;
      based on detecting the operation executed by the user, reproduce, using a robotic process automation module, the operation in parallel with execution of the operation by the user to generate a simulated operation; and
      store the simulated operation in a user operation record.

2. The system of claim 1, wherein the processing device is further configured to install the robotic process automation module on the user device.

3. The system of claim 2, wherein the processing device is a first processing device, and the robotic process automation module is configured to command a second processing device associated with the user device to execute the simulated operation in parallel with execution of the operation by the user.

4. The system of claim 1, wherein the simulated operation is executed in a virtual environment.

5. The system of claim 1, wherein the robotic process automation module is configured to monitor and reproduce the operation executed by the user in real-time.

6. The system of claim 1, wherein the robotic process automation module is configured to reproduce the operation executed by the user by interacting directly with a presentation layer of a user interface of the user device.

7. The system of claim 1, wherein the user device is commanded to terminate the operation executed by the user and switch to the simulated operation based on determining an error associated with the operation executed by the user that is not present in the simulated operation, wherein a result of the simulated operation replaces a result of the operation executed by the user.

8. The system of claim 1, wherein the operation executed by the user comprises executing a command, altering a file, or entering data.

9. The system of claim 8, wherein an error log is stored within the file or the application associated with the error.

10. The system of claim 1, wherein the processing device is further configured to:
    receive an indication of an error associated with the application;
    based on receiving the indication of the error, extract the user operation record and device information from the user device;
    generate a support ticket comprising the user operation record and the device information; and
    transmit the support ticket to a support representative workstation.

11. The system of claim 10, wherein the processing device is further configured to:
    compare a result of the operation executed by the user with an expected result; and
    based on the result of the operation executed by the user not matching the expected result, generate the indication of the error.

12. The system of claim 10, the processing device being further configured to automatically generate the support ticket and transmit the support ticket to the support representative workstation, wherein the support ticket includes the user operation record.

13. The system of claim 10, wherein the indication of the error is a message transmitted from the user.

14. The system of claim 13, wherein the processing device is configured to monitor messages from the user for one or more keywords related to the error, and based on the one or more keywords related to the error, automatically generate the support ticket.

15. The system of claim 1, wherein the robotic process automation module comprises a process recorder.

16. A computer program product for robotic process automation enabled file dissection for error diagnosis and correction, the computer program product comprising at least one non-transitory computer-readable medium having computer-readable program code portions embodied therein, the computer-readable program code portions comprising:
   an executable portion configured for detecting an operation executed by a user in an application on a user device;
   an executable portion configured for reproducing, using a robotic process automation module, the operation in parallel with execution of the operation by the user to generate a simulated operation based on detecting the operation executed by the user; and
   an executable portion configured for storing the simulated operation in a user operation record.

17. The computer program product of claim 16, the computer-readable program code portions further comprising an executable portion configured for installing the robotic process automation module on the user device.

18. The computer program product of claim 16, wherein the simulated operation is executed in a virtual environment.

19. The computer program product of claim 16, wherein the robotic process automation module is configured to reproduce the operation executed by the user by interacting directly with a presentation layer of a user interface of the user device.

20. A computer-implemented method for robotic process automation enabled file dissection for error diagnosis and correction, the method comprising:
   detecting an operation executed by a user in an application on a user device;
   based on detecting the operation executed by the user, reproducing, using a robotic process automation module, the operation in parallel with execution of the operation by the user to generate a simulated operation; and
   storing the simulated operation in a user operation record.

* * * * *